United States Patent [19]
Guyot et al.

[11] Patent Number: 6,119,098
[45] Date of Patent: Sep. 12, 2000

[54] SYSTEM AND METHOD FOR TARGETING AND DISTRIBUTING ADVERTISEMENTS OVER A DISTRIBUTED NETWORK

[75] Inventors: Patrice D. Guyot, 160 E. 26th St., Apt. 5H, New York, N.Y. 10010; Laurent Gautier, 1bis rue Balliet, 95000 Neuville sur Oiso, France

[73] Assignees: Patrice D. Guyot, Jersey City, N.J.; Laurent Gautier, Nueville sur Oiso, France

[21] Appl. No.: 08/950,200

[22] Filed: Oct. 14, 1997

[51] Int. Cl.[7] .................................................. G06F 17/60
[52] U.S. Cl. .................................. 705/14; 705/10; 705/26
[58] Field of Search .............................. 705/14, 10, 26, 705/27

[56] References Cited

U.S. PATENT DOCUMENTS

| | | |
|---|---|---|
| 5,353,218 | 10/1994 | De Lapa et al. ......................... 705/14 |
| 5,448,625 | 9/1995 | Lederman ............................ 379/88.25 |
| 5,515,270 | 5/1996 | Weinblatt ................................. 705/14 |
| 5,557,721 | 9/1996 | Fite et al. ................................. 705/14 |
| 5,583,763 | 12/1996 | Atcheson et al. ......................... 705/10 |
| 5,614,927 | 3/1997 | Gifford et al. .......................... 707/531 |
| 5,615,341 | 3/1997 | Agrawal et al. ........................... 705/10 |
| 5,627,973 | 5/1997 | Armstrong et al. ...................... 705/10 |
| 5,636,346 | 6/1997 | Saxe ........................................ 705/1 |
| 5,717,860 | 2/1998 | Graber et al. ............................. 705/14 |
| 5,717,923 | 2/1998 | Dedrick .................................... 705/26 |
| 5,724,521 | 3/1998 | Dedrick .................................... 705/10 |
| 5,740,549 | 4/1998 | Reilly et al. .............................. 705/14 |
| 5,781,894 | 7/1998 | Petrecca et al. .......................... 705/14 |
| 5,794,210 | 8/1998 | Goldhaber ................................ 705/14 |
| 5,809,242 | 9/1998 | Shaw et al. ............................. 709/217 |
| 5,812,769 | 9/1998 | Graber et al. ............................. 705/14 |
| 5,848,396 | 12/1998 | Gerace .................................... 705/10 |
| 5,848,397 | 12/1998 | Marsh et al. ............................. 705/14 |
| 5,855,008 | 12/1998 | Goldhaber et al. ....................... 705/14 |
| 5,864,823 | 1/1999 | Levitan ................................... 705/14 |
| 5,893,111 | 4/1999 | Sharon, Jr. et al. .................... 707/104 |
| 5,915,243 | 6/1999 | Smolen .................................... 705/14 |
| 5,933,811 | 8/1999 | Angles et al. ............................ 705/14 |
| 5,937,392 | 8/1999 | Alberts .................................... 705/14 |

(List continued on next page.)

OTHER PUBLICATIONS

The PointCast Network, pp. 1–6.
Baum, David; Esch, Jim, "Step Right Up", HP Professional, vol. 9, No. 10, p. 28, Oct. 1995.
Internet Access: Internet Marketing Revolution Begins in the U.S. This Sep.; Hyper System Promises New Cash Flow for Providers, Free Access for Users & New Marketing Opportunity for Business, Edge: Work–Group Computing Report, vol. 7, No. 316, p. 2.
Ebenkamp, Becky, "Gold on That Thar Web", Brandweek, vol. 37, No. 29, pp. 17–18, Abstract, Jul. 15, 1996.
"Interactive Hyper Net US: New Unique Internet Access Without Monthly Charges Goes On–Line in Bay Area", M2 Presswire, Dialog File 636:Newsletter DB, Dec. 23, 1996.
PointCast, "The PointCast Network" product brochure, pp. 1–6.

*Primary Examiner*—Emanuel Todd Voeltz
*Assistant Examiner*—John W. Hayes
*Attorney, Agent, or Firm*—Oliff & Berridge, PLC

[57] ABSTRACT

A system and method for targeting and distributing advertisements over a distributed information network includes a client application that displays targeted advertisements on a subscriber's computer and a server that manages an advertisement database and provides advertisements to the subscriber's computer. Advertisements are specifically targeted to the subscriber based on a personal profile provided by the subscriber. The client application periodically accesses the server over a distributed information network to download the targeted advertisements. The client application preferably displays the downloaded advertisements in an advertising window that is continuously displayed on the subscriber's computer and that is sensitive to mouse and/or keyboard activity, even if other applications are running concurrently on the subscriber's computer. Thus, the probability that a subscriber will view an advertisement that is specifically for the subscriber is relatively high.

27 Claims, 10 Drawing Sheets

U.S. PATENT DOCUMENTS

| | | | |
|---|---|---|---|
| 5,948,061 | 9/1999 | Merriman et al. | 705/14 |
| 5,974,398 | 10/1999 | Hanson et al. | 705/14 |
| 5,974,451 | 10/1999 | Simmons | 705/14 |
| 6,009,409 | 12/1999 | Adler et al. | 705/14 |
| 6,009,410 | 12/1999 | LeMole et al. | 705/14 |
| 6,026,368 | 2/2000 | Brown et al. | 705/14 |
| 6,026,369 | 2/2000 | Capek | 705/14 |

SYSTEM AND METHOD FOR TARGETING AND DISTRIBUTING ADVERTISEMENTS OVER A DISTRIBUTED NETWORK

BACKGROUND OF THE INVENTION

1. Field of Invention

This invention relates to distributed network systems. Specifically, this invention is directed to a system and method for targeting and distributing advertisements over a distributed network, such as the Internet.

2. Description of Related Art

The number of users accessing and utilizing distributed information networks, such as the Internet, is rapidly growing. As a result, the Internet is rapidly becoming a popular advertising and marketing medium.

The PointCast® Network, which "broadcasts" personalized news to Internet users, also allows advertisers to deliver advertisements directly to Internet users. The advertisements delivered by the PointCast® Network appear on the user's computer when the computer is running the PointCast® Network application software.

The PointCast® Network application has a "screen saver" mode and a "channel viewer" mode. In the screen saver mode, the PointCast® Network application displays advertisements on the user's computer in a random fashion. In the channel viewer mode, the PointCast® Network application displays advertisements while the user is viewing their personalized news. In the channel viewer mode, the Point-Cast® Network application can also display advertisements that are related to the type of news or information being viewed by the user.

One problem with the PointCast® Network is the limited exposure users have to the advertisements. In the screen saver mode, the user is typically not using the computer. Therefore, the probability that a user will view a displayed advertisement is relatively low. For a user to be exposed to an advertisement in the channel viewer mode, the user must be accessing the PointCast® Network software to view news. Thus, when the user is performing other activities on the computer, the probability of viewing an advertisement is relatively low.

Another problem with the PointCast® Network is that the PointCast® Network server downloads all available advertisements to every user that accesses the PointCast® Network. The PointCast® Network application then groups and displays the advertisements according to the viewing mode currently set, i.e., screen saver or channel viewer mode, and the type of news being accessed by the user, when the PointCast® Network application is in the channel viewer mode. Thus, the advertisements are not specifically targeted for each individual user.

SUMMARY OF THE INVENTION

This invention provides a system and a method for targeting and distributing advertisements over a distributed information network, such as the Internet. The system and method of this invention provide a "client" application that runs on a subscriber's computer. The system and method of this invention also provide a server that manages an advertisement database and that provides advertisements to the "client" application that are targeted to each individual subscriber, based on a personal profile provided by that subscriber.

The client application periodically accesses the server over a distributed information network, e.g., the Internet, to download the specifically targeted advertisements. The client application displays the downloaded advertisements on the subscriber's computer, preferably in an advertising "window" that is continuously displayed on the subscriber's computer, even if other applications are running concurrently on the subscriber's computer. Accordingly, the probability that a subscriber will view an advertisement that is specifically targeted for the subscriber is relatively high.

In a preferred embodiment, the client application monitors the keyboard and mouse activity on the subscriber's computer to determine when the subscriber is most likely to be watching the computer screen. The client application then uses this information to schedule the display of advertisements on the subscriber's computer.

In another embodiment, the client application also includes a screen saver mode that is activated when the subscriber's computer is idle for a predetermined period of time. When the screen saver mode is activated, the client application displays advertisements that are specifically registered for display when the screen saver mode is activated. Thus, an advertiser can have more control over how advertisements are displayed on the subscriber's computer.

In a further embodiment, the client application accumulates subscriber statistics and sends the subscriber statistics to the server when the subscriber's computer accesses the server. For example, the client application can accumulate statistics on which advertisements have been displayed and, for each advertisement, the number of times (and/or how long) it has been displayed.

In yet another embodiment, the subscriber's computer automatically accesses the server to download new advertisements and to transfer subscriber statistics to the server whenever an advertisement "queue" of available advertisements has reached a predetermined low level trigger value. Thus, the advertisements displayed on the subscriber's computer are always up to date.

In another embodiment, the client application keeps track of Internet sites that the subscriber has accessed over a predetermined period of time. The client application then transfers the Internet site information to the server, which utilizes this information to further define the subscriber's personal profile.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
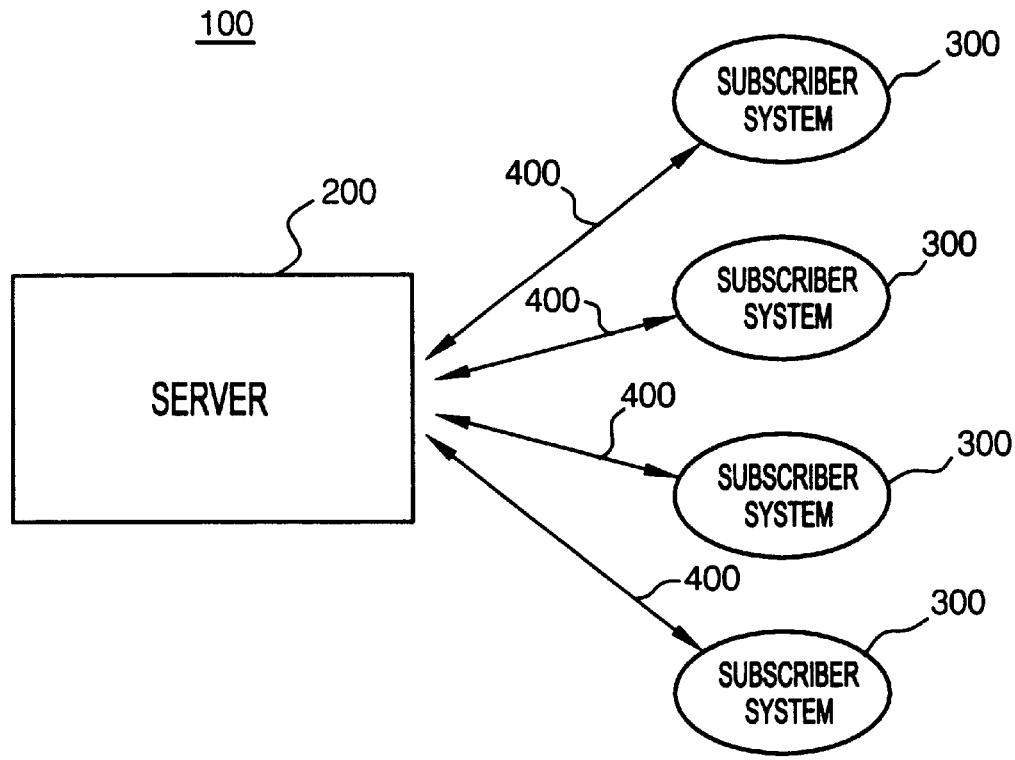
FIG. 1 is a block diagram of a distributed information network over which the advertisement targeting system of this invention operates.

FIG. 1 shows a distributed information network 100, e.g., the Internet network, over which the advertisement targeting system of this invention operates. The system 100 includes a server 200 and multiple subscriber systems 300.

Information is exchanged between the server 200 and the subscriber system 300 over communication links 400. In a preferred embodiment, the distributed information network 100 is implemented on the Internet, with the server 200 and each of the subscriber system 300 having a unique proprietary identifier.

The server 200 stores and manages an advertisement database that includes a personal profile for each subscriber. The subscriber system 300 periodically access the server 200 to download advertisements that are specifically targeted to the subscriber based on the subscriber's personal profile stored on the server 200. The subscriber system 300 then display the targeted advertisements.

Figure 2:
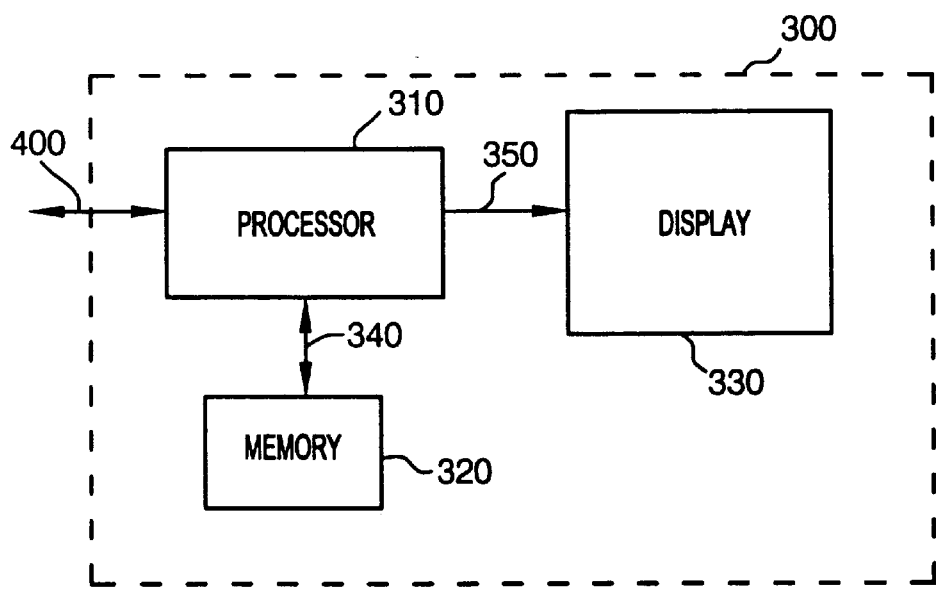
FIG. 2 is a block diagram of a preferred subscriber system used in the advertisement targeting system of this invention.

FIG. 2 shows a preferred embodiment of a subscriber system 300. The subscriber system 300 includes a processor 310, a memory 320 and a display 330. The memory 320 stores a client application. The processor 310 accesses and executes the client application stored in the memory 320 over a signal line 340, and sends display data to the display 330 over signal line 350.

In operation, the processor 310 executes the client application stored in the memory 320. The processor, while executing the client application, exchanges information with the server 200 via the communication link 400, and displays the advertisements on a display 330.

Figure 3:
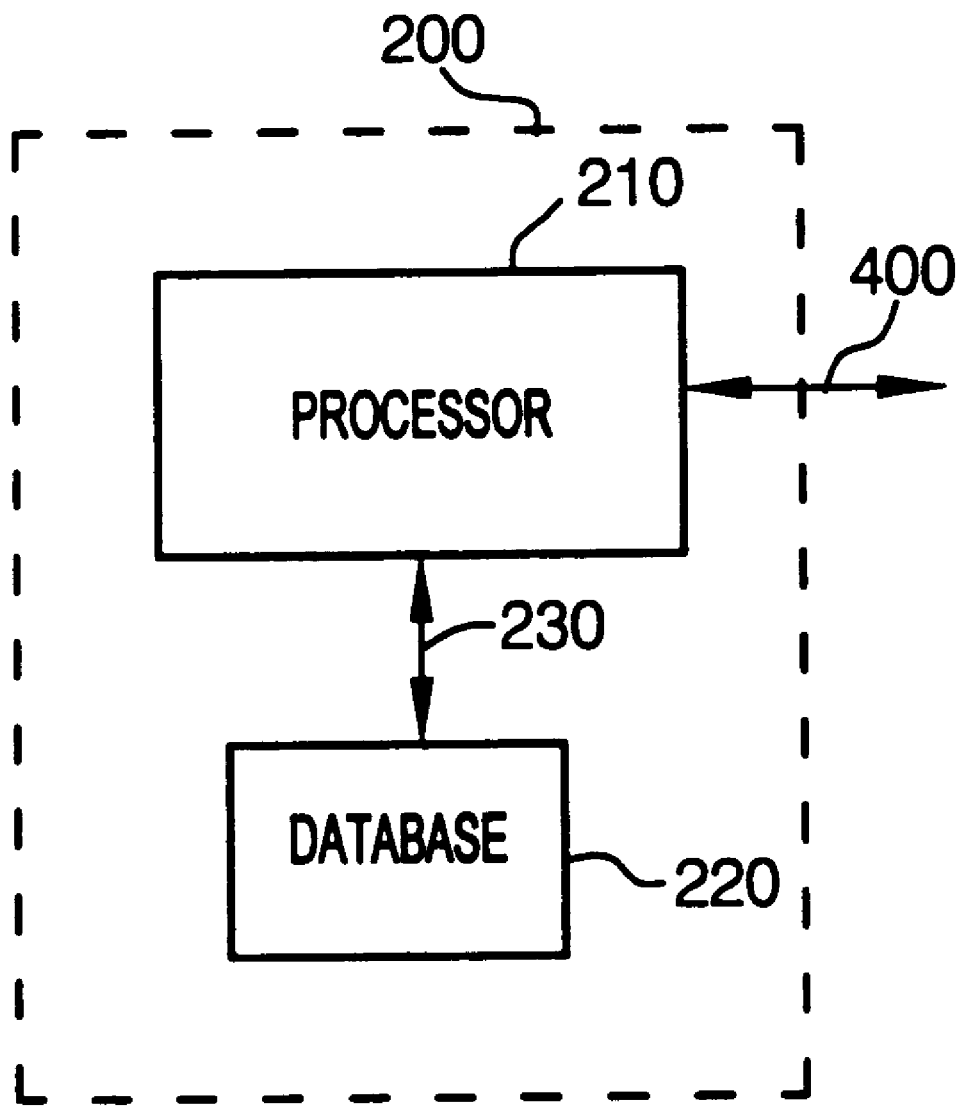
FIG. 3 is a block diagram of a preferred server used in the advertisement targeting system of this invention.

FIG. 3 shows a preferred embodiment of the server 200. The server 200 includes a processor 210 and a memory 220 that stores an advertisement database. The server 200 exchanges information with the subscriber system 300 over the communication links 400. The processor 210 exchanges data with the memory 220 over a signal line 230.

The processor 210 manages the database, and addresses advertisements to specifically targeted subscribers based on a subscriber's personal profile stored in the database. The processor 210 also manages the distribution queue of the advertisements, and manages connections between the server 200 and the subscriber system 300.

The database 220 preferably includes Subscriber Data, Advertiser Data, Advertisement Data, Subscriber Statistics, and Client Application Software Data. The Subscriber Data preferably includes, for each subscriber, the subscriber's identification information, a password assigned to the subscriber, and a personal profile of the subscriber that is used to target specific advertisements to the subscriber. The subscriber's personal profile is preferably obtained by having the subscriber provide answers to a questionnaire. The answers to the questionnaire are used to build the subscriber's personal profile which is then stored in the database 220.

The Advertiser Data preferably includes identification information for each advertiser that provides advertisements to be distributed to the subscriber system 300. The Advertisement Data preferably includes, for each advertisement, the identification of the advertiser that provided the advertisement, the time frame during which the advertisement should be displayed on the subscriber system 300, the profile of the subscriber that the advertisement should be targeted to, the maximum number of times the advertisement should be displayed, the maximum number of times the advertisement should be displayed per day, the size of the advertisement, the Uniform Resource Locator (URL) address of the advertiser, the expiration date of the advertisement, the number of times the advertisement has already been distributed, and the number of times the advertisement has already been displayed.

The Subscriber Statistics preferably include, for each subscriber, the advertisements distributed to the subscriber, and the number of times each advertisement has been effectively displayed on the subscriber's system. In addition, the Subscriber Statistics preferably include information on Internet sites that the subscriber has accessed over a predetermined period of time. When this information is transferred to the server 200, the server utilizes the information to further define the subscriber's personal profile.

The Client Application Software Data preferably includes information on the latest version of the client application software, and the URL address of the latest version of the client application software.

As described above, the processor 310 of the subscriber system 300 executes the client application. The processor 310 maintains a "context" that includes a "Subscriber Context" and various other configuration data, such as the URL address used by the processor 310 to access the server 200 over the Internet.

The Subscriber Context preferably includes the queue of the advertisements to be displayed, and the Subscriber Statistics. The Subscriber Context, stored in the memory 320, preferably includes the following data for each advertisement:

(1) Ad Identification: a unique identifier for each advertisement;

(2) Ad Play Times Maximum Number: the maximum number of times each advertisement should be displayed;

(3) Ad Expiration Date: a date beyond which the advertisement should no longer be displayed;

(4) Ad Player Identification: a unique identifier of the type of client application software that must be used to display the advertisement;

(5) Ad Document URL: the Universal Resource Locator address of the advertisement file;

(6) Ad Width: the width of the advertisement on a display 330 when the advertisement is displayed;

(7) Ad Height: the height of the advertisement on the display when the advertisement is displayed;

(8) Ad Hour Frames: the hours of the day during which the advertisement should be displayed;

(9) Ad Day Frames: the days of the week during which the advertisement should be displayed;

(10) Ad Week Frames: the weeks in the month during which the advertisement should be displayed;

(11) Ad Month Frames: the months in the year during which the advertisement should displayed;

(12) Ad Frequency: the maximum number of times the advertisement should be displayed in one day;

(13) Daily Ad Playing Counter: the number of times the advertisement has been displayed on a given day;

(14) Last Playing Day: the date to which the Daily Ad Playing Counter applies; and

(15) Total Ad Playing Counter: the total number of times an advertisement has been displayed since the last connection to the server 200.

In a preferred embodiment, the processor 310, while executing the client application, monitors the activity of any input devices (not shown), e.g., a keyboard or a mouse, to determine when the subscriber is most likely to be watching the display 330. The processor 310 preferably uses this information to schedule the display of advertisements.

The processor 310 preferably switches to a screen saver mode when the subscriber system 300 has been idle for a predetermined length of time, e.g., when no input activity has been detected over a predetermined length of time. While in the screen saver mode, the processor 310 preferably displays advertisements that have been specifically registered for display during the screen saver mode.

When the processor 310 establishes a connection with the server 200, the processor 310 refreshes the queue of the advertisements to be displayed, uploads the Subscriber Statistics to the server 200, and downloads, if necessary, the latest version of the client application software from the server 200. The processor 310 displays the advertisements on a display 330, preferably in a window that is continuously displayed, even if other applications are concurrently running on the processor 310.

Figure 4A:
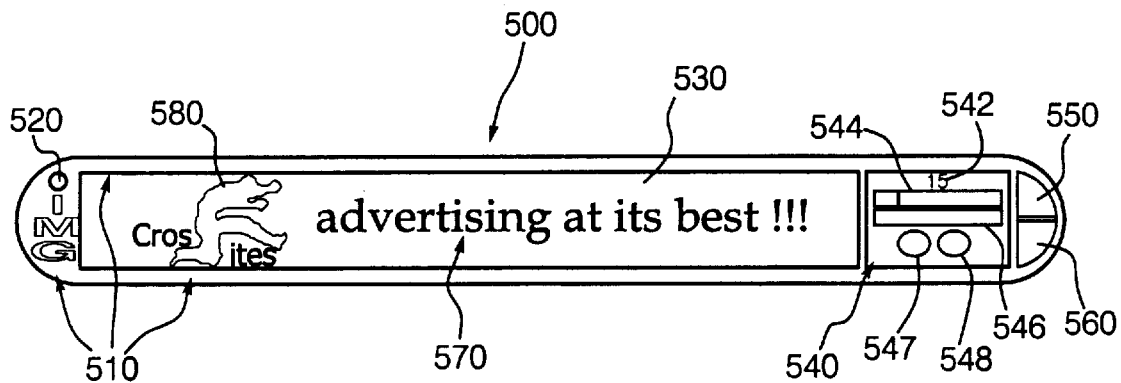
FIGS. 4A and 4B are representative displays generated by the advertisement targeting system of this invention.
Figure 4B:
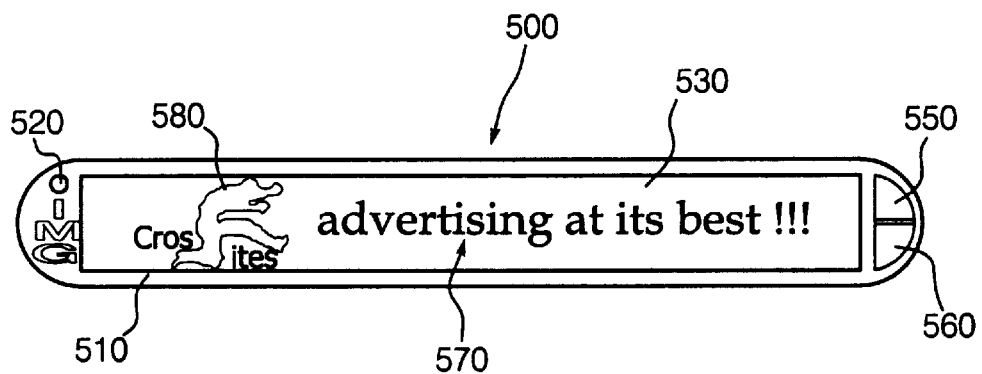

FIGS. 4A and 4B show a preferred application window 500 for displaying the advertisements and providing other information to the subscriber. The application window 500 preferably includes a window frame 510, a Subscriber Context state indicator 520, an advertising window 530, a status window 540, a connection button 550, and a status button 560.

The application window frame 510 enables the subscriber to move the application window 500 to different parts of the display 330 by "dragging" and "dropping" the application window 500 to another display location. The Subscriber Context state indicator 520 informs the subscriber of the need to connect to the server 200 in order to update the advertisement queue and to upload the Subscriber Statistics to the server 200. In the preferred embodiment, the color of the context state indicator 520 changes to reflect the need to connect to the server 200.

The advertising window 530 displays the visible portion 570 of the advertisement document. If the advertisement document is a multimedia document, i.e., an advertisement that includes audio, the advertisement document is not limited to the visible portion 570 displayed in the display window 530. In the preferred embodiment, the processor 310 can dynamically resize the advertising window 530 to accommodate different size advertisements. In addition, the advertisement document displayed in the advertisement window 530 may be interactive. For example, the advertisement document displayed in the advertisement window 530 may include an Internet link 580. The subscriber may select the Internet link 580 by "clicking" on the Internet link 580 with a mouse or other input device. When the subscriber selects the Internet link 580, the processor 310 retrieves or "fetches" the document associated with the Internet link 580 from the Internet site on which the document is stored.

In order to retrieve the document associated with the Internet link 580, the processor 310 must be programmed with Internet access software. The Internet access software may be incorporated into the client application software stored in the memory 320, or may be Internet access software that is separate from the client application software.

The status window 540 displays certain information from the Subscriber Context. The status window 540 preferably displays a total credit amount indicator 542, a virtual credit amount indicator 544, a connection time-out indicator 546, a profile update button 547, and a quit button 548.

In the preferred embodiment, the processor 310 assigns "credits" to the subscriber based on the number of advertisements the subscriber has been exposed to. This information may then be used to provide renumeration to the subscriber based on the number of advertisements displayed on the subscriber system 300. The total credit amount indicator 542 represents the number of credits the subscriber has earned over a predetermined period of time. The processor 310 preferably sends the total credit amount information to the server 200 when a connection is established with the server 200.

The virtual credit amount indicator 544 indicates the number of credits to upload. The processor 310 sends this information to the server 200 when a connection is established. The server 200 preferably utilizes this information to update the subscriber's total credit amount stored on the server data 220, and sends the new total credit amount to the processor 310 for display in the total credit amount indicator 542. The total credit amount is a value that is determined based on the total number of advertisements that have been displayed on the subscriber system 300. As explained above, the total credit amount may be used to provide renumeration to the subscriber based on the number of advertisements that have been displayed on the subscriber system 300.

The profile update button 547 is used to update the subscriber's personal profile. When the subscriber selects the profile update button 547, using a mouse or other input device, the processor 310 accesses the server 200 to update the subscriber's personal profile. In the preferred embodiment, the processor 310 launches a separate Internet access application, e.g., an Internet browser, to access the server 200 for the purpose of updating the subscriber's profile.

The quit button 548 is used to terminate the client application. The subscriber quits the client application by selecting the quit button 548 with a mouse or other input device. The connection button 550 is used to establish a connection with the server 200. The subscriber selects this button in order to manually establish a connection with the server 200. The status button 560 is used to display or hide the status window 540. When the subscriber selects the status button 560, the status window 540 is alternately hidden, as shown in FIG. 4B, or displayed, as shown in FIG. 4A.

In the preferred embodiment, the Subscriber Statistics are valid for a predetermined period of time. The processor 310 must establish a connection with the server 200 and transfer the Subscriber Statistics to the server 200 within the predetermined period of time, or the Subscriber Statistics will not be accepted by the server 200. The connection time-out indicator 546 informs the user of the amount of time remaining before the Subscriber Statistics expire, i.e., the amount of time remaining to establish a connection with the server 200. The connection time-out indicator 546 preferably displays the amount of time remaining before the Subscriber Statistics expire by displaying the information in a multilevel gauge.

Figure 5:
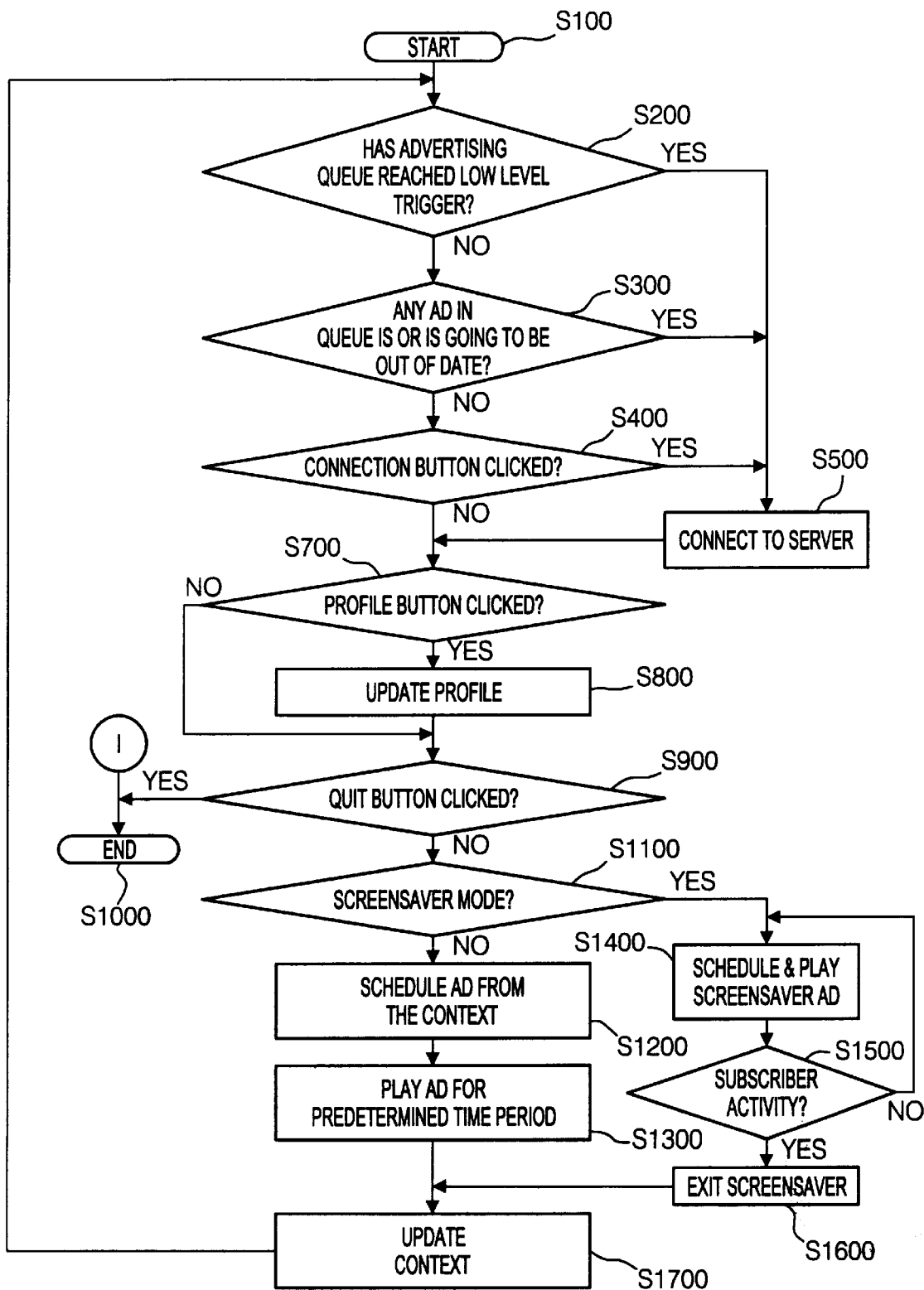
FIG. 5 is a flow chart of a preferred control routine for the subscriber system shown in FIGS. 1 and 2.

FIG. 5 shows a preferred control routine for the subscriber system 300. The routine starts at step S100 and proceeds to step S200, where the control system determines if the advertising queue has reached a low level trigger. As described above, the "Ad Play Times Maximum Number", associated with each advertisement, defines the maximum number of times the advertisement should be displayed. When an advertisement has been displayed the maximum number of times, that advertisement is taken out of the advertisement queue and is no longer displayed. The control system determines if the number of advertisements in the advertisement queue has reached a predetermined low level trigger. If the low level trigger has been reached, control jumps to step S500. Otherwise, control continues to step S300.

At step S300, the control system determines if any individual advertisement in the advertisement queue is already out of date or is going to be out of date within a predetermined time period. As described above, each individual advertisement has an associated expiration date represented by the "Ad Expiration Date". Once the advertisement's expiration date arrives, that advertisement is taken out of the advertisement queue and is no longer displayed. The control system determines if any advertisement in the advertisement queue is already out of date, or if any advertisement is within a predefined number of days of going out of date. If so, control jumps to step S500. Otherwise, control continues to step S400.

At step S400, the control system determines if the connection button 550 has been selected by the subscriber. If the connection button 550 has been selected, control continues to step S500. Otherwise, control jumps to step S700. At step S500, the control system establishes a connection with the server 200 and exchanges the various data described above. Control then jumps to step S700.

At step S700, the control system determines if the profile button 547 has been selected by the subscriber. If the profile button 547 has been selected, control continues to step S800. Otherwise, control jumps to step S900. At step S800, the control system accesses the server 200 and updates the subscriber's profile. As described above, the advertisement targeting system of this invention preferably utilizes a separate Internet access application, e.g., an Internet browser, to establish a connection with the server 200 when updating the subscriber's personal profile. Control then continues to step S900.

Next, at step S900, the control system determines if the quit button 548 has been selected by the subscriber. If the quit button has been selected, control continues to step S1000, where the control routine ends. Otherwise, control jumps to step S1100, where the control system determines if the screen server mode has been activated. As described above, the screen saver mode is activated when the subscriber system 300 has been idle for a predetermined period of time. The control system preferably determines this by monitoring the activity of input devices connected to the subscriber system 300, e.g., a keyboard or a mouse. If the screen saver mode has not been activated, control continues to step S1200. Otherwise, if the screen saver mode has been activated, control jumps to step S1400.

At step S1200, the control system chooses an advertisement to display from the advertisement queue in the Subscriber Context. Next, at step S1300, the control system displays the selected advertisement for a predetermined period of time. Control then jumps to step S1700.

At step S1400, the control system selects and plays, from the advertisement queue, an advertisement that has been registered for display during the screen saver mode. Next, at step S1500, the control system determines if there is subscriber activity by monitoring the activity of any input devices connected to the subscriber system 300. If there has been any subscriber activity, control continues to step S1600. Otherwise, control jumps back to step S1400. At step S1600, the control system exits the screen saver mode. Control then continues to step S1700. At step S1700, the control system updates the Subscriber Context. Specifically, the control system updates the "Daily Ad Playing Counter", "Last Playing Day", and "Total Ad Playing Counter". Control then jumps back to step S200.

Figure 6A:
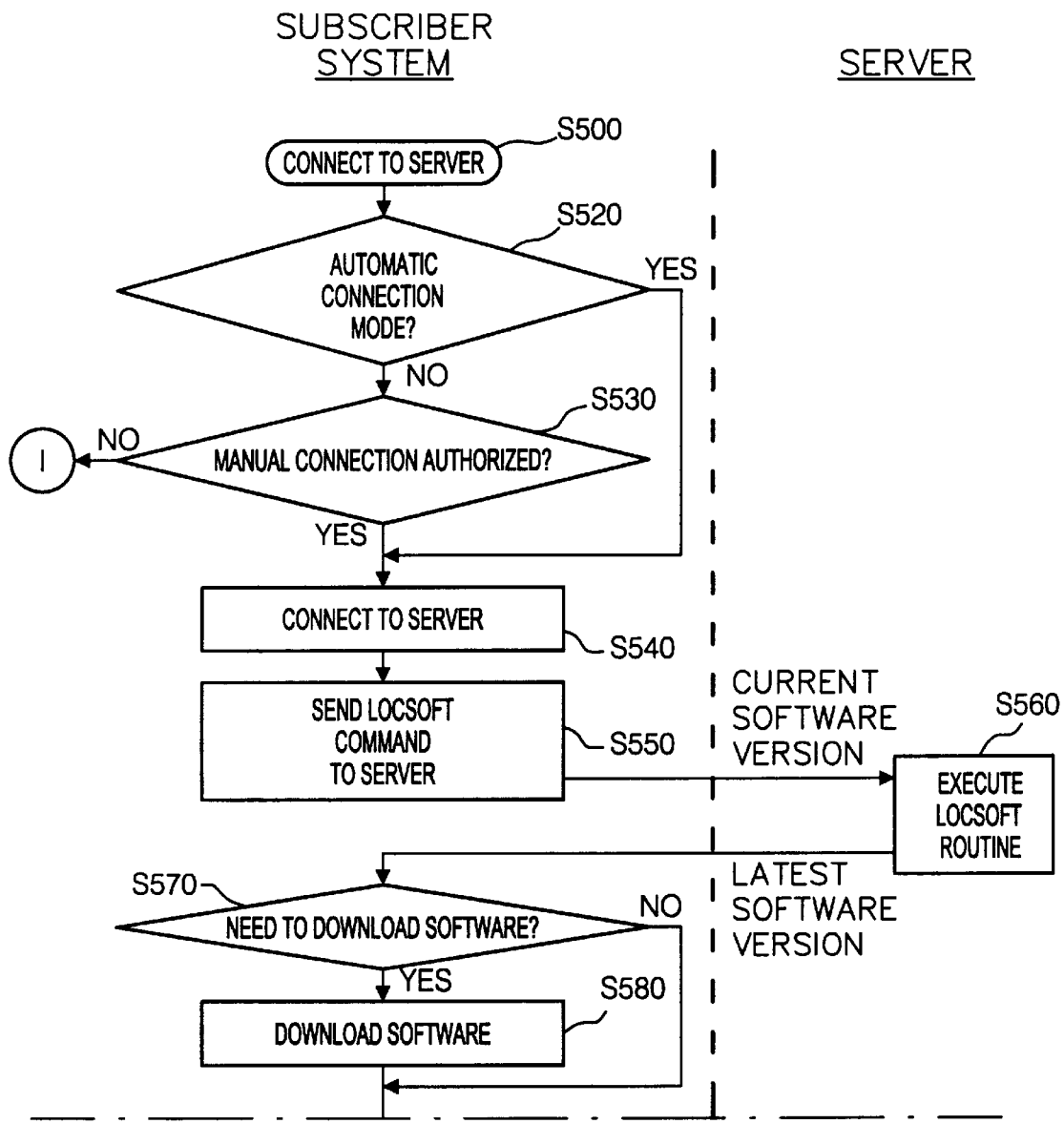
FIGS. 6A and 6B are flow charts of a preferred control routine for exchanging information between the subscriber system and the server.
Figure 6B:
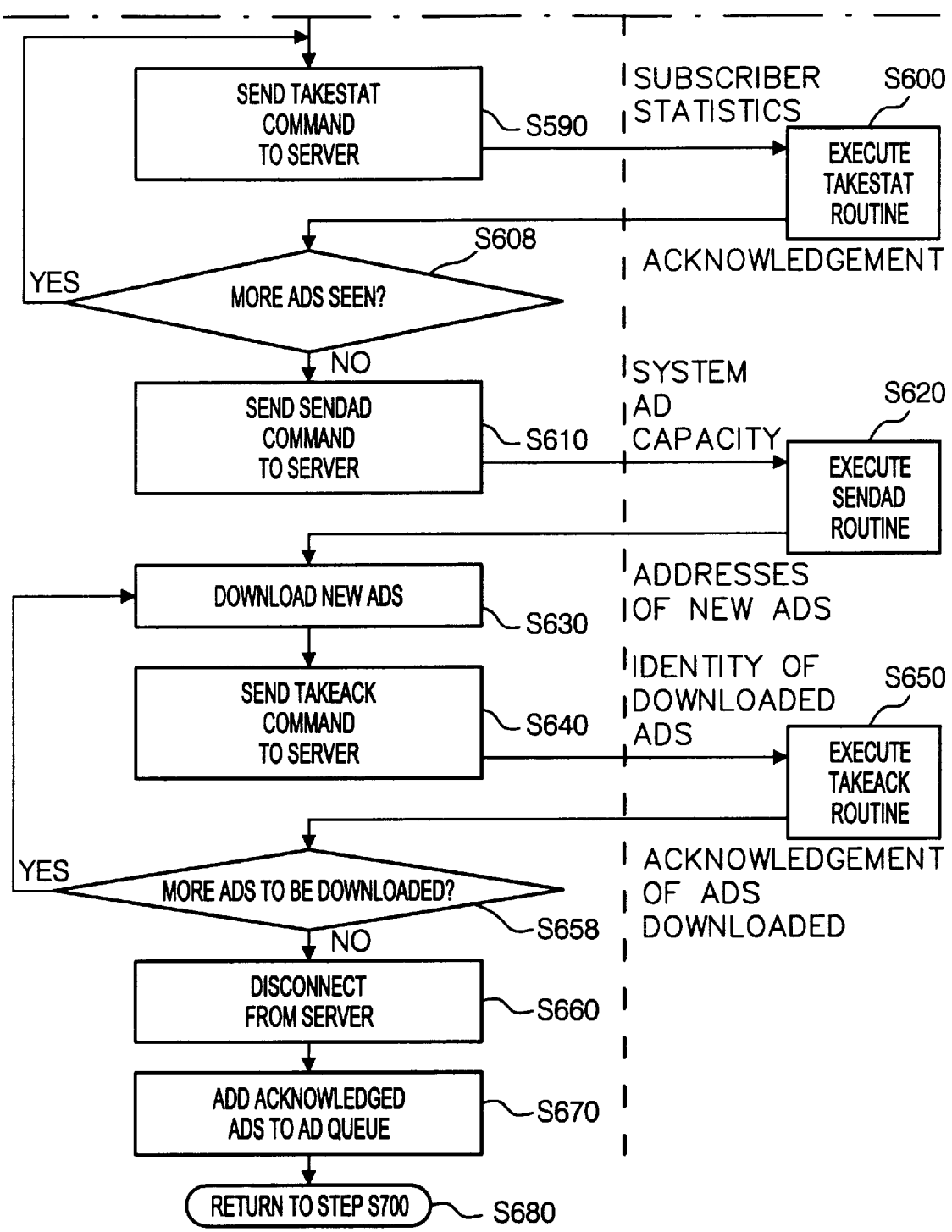

FIGS. 6A and 6B show a preferred control routine for the server connection step S500 of FIG. 5. The flow chart shown in FIGS. 6A and 6B also illustrate the exchange of data between the subscriber system 300 and the server 200.

The "CONNECT TO SERVER" routine starts at step S500 and proceeds to step S520, where the control system determines if an automatic connection mode is enabled. If so, control jumps directly to step S540. Otherwise, control continues to step S530.

At step S530, the control system determines if a manual connection to the server has been authorized. As described above, the subscriber can manually instigate a connection to the server 200 by selecting the connection button 550 in the client application window 500. If the connection button 550 has been selected, control continues to step S540. Otherwise, control returns to step S1000 of the control routine shown in FIG. 5.

At step S540, the control system establishes a connection to the server 200 over the communication link 400. Next, at step S550, the control system sends a LOCSOFT command to the server 200 over the communication link 400. The LOCSOFT command sent to the server 200 also includes information regarding the version of the client application software being run on the subscriber system 300. Control then continues to step S560, where the server 200 executes the LOCSOFT routine, shown in FIG. 7, and sends information on the latest version of the client application software to the subscriber system 300.

Next, at step S570, the control system determines if the latest version of the client application software needs to be downloaded based on the software version information sent from the server 200 at step S560. If the latest client application software needs to be downloaded, control continues to step S580. Otherwise, control jumps directly to step S590.

At step S580, the control system downloads the latest client application software by connecting to the Internet site on which the latest client application software is stored. The URL address of the Internet site that contains the latest client application software is supplied to the subscriber system 300 by the server 200 at step S560. Control then continues to step S590.

At step S590, the control system sends a TAKESTAT command to the server 200 for an advertisement that has been seen. The TAKESTAT command sent to the server 200 includes the Subscriber Statistics. At step S600, the server 200 executes the TAKESTAT routine shown in FIG. 8 and sends an acknowledgment signal to the subscriber system 300. Then, at step S608, the control system determines if there are any more advertisements that have been seen. If so, control returns to step S590, where the control system sends a TAKESTAT command to the server 200 for an advertisement that has been seen. This loop is repeated until the TAKESTAT command has been sent to the server 200 for all advertisements that have been seen. Thus, at step S608, if there are no more advertisements that have been seen, control continues to step S610.

Next, at step S610, the control system sends a SENDAD command to the server 200. The SENDAD command sent to the server 200 includes information on the advertisement capacity of the advertisement queue on the subscriber system 300. Control then continues to step S620, where the server 200 executes the SENDAD routine shown in FIG. 9. The URL addresses of the Internet sites that contain the new advertisements are supplied to the subscriber system 300 by the server 200 at step S620. Of course, it should be appreciated that the server 200 could instead supply the actual advertisements to the subscriber system 300, rather than URL addresses of the Internet sites containing the advertisements.

Next, at step S630, the control system downloads one new advertisement from its corresponding Internet site. Control then continues to step S640, where the control system sends a TAKEACT command to the server 200. The TAKEACT command sent to the server 200 includes information on the identity of the new advertisement downloaded at step S630.

Figure 10:
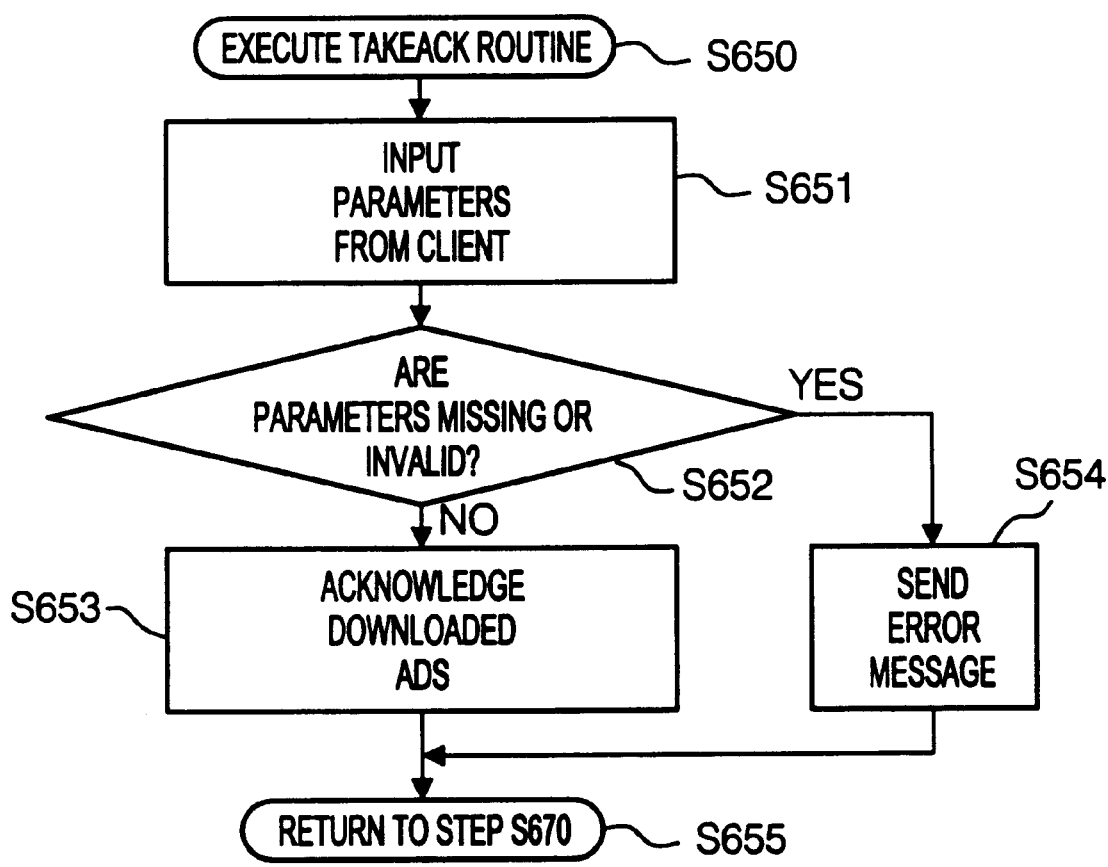
FIG. 10 is a flow chart of a preferred control routine, executed by the server, for acknowledging that new advertisements have been downloaded by the subscriber system.

Next, at step S650, the server 200 executes the TAKEACT routine shown in FIG. 10 for the advertisement that has been downloaded and sends a signal acknowledging that the advertisement has been downloaded by the subscriber system 300. Then, at step S658, the control system determines if there are any more advertisements that need to be downloaded. If so, control returns to step S630, where the control system downloads another new advertisement from its corresponding Internet site. This loop is repeated until all advertisements have been downloaded from their corresponding Internet sites. Thus, at step S658, if there are no more advertisements that need to be downloaded, control continues to step S660.

Next, at step S660, the control system disconnects from the server 200. Then, at step S670, the control system adds the advertisements acknowledged at step S650 to the advertisement queue. Control then continues to step S680, where the routine returns to step S700 of the main control routine shown in FIG. 5.

Figure 7:
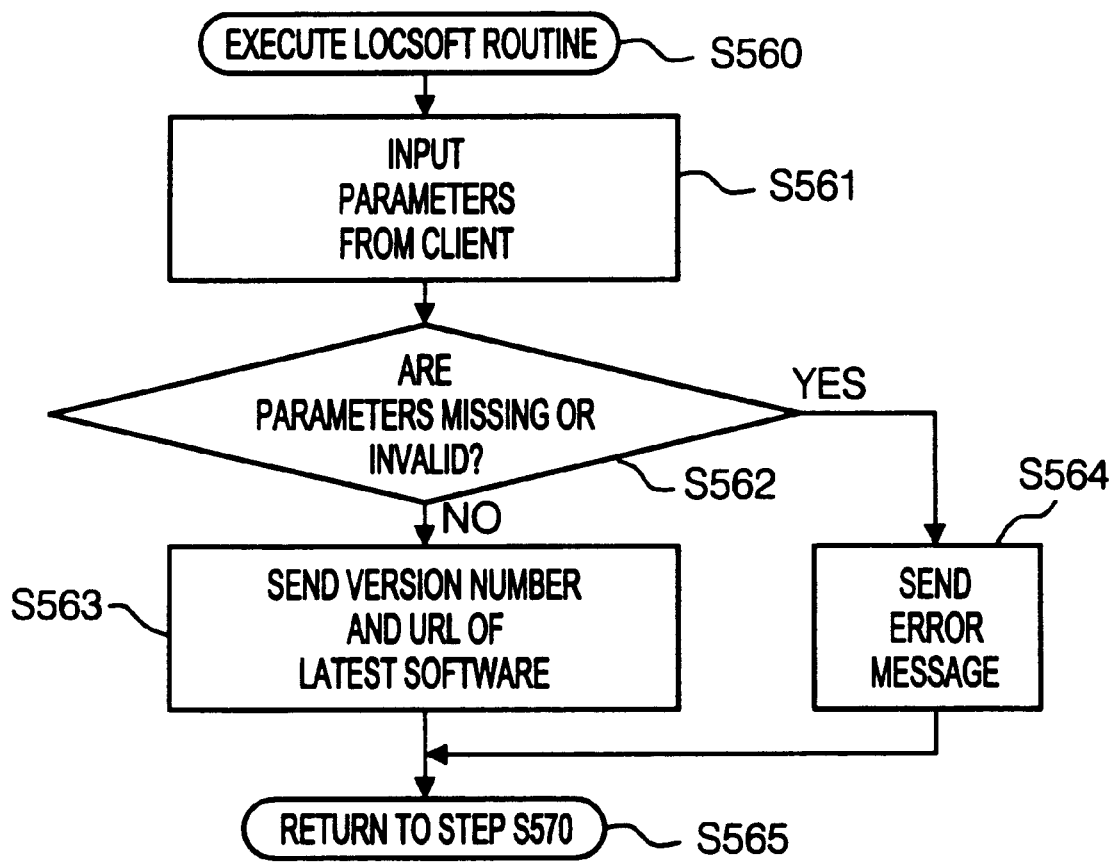
FIG. 7 is a flow chart of a preferred control routine, executed by the server, for updating a client application software on the subscriber system.

FIG. 7 shows a preferred version of the LOCSOFT routine executed by the server 200 at step S560 of FIG. 6A, which is used to update the client components software on the subscriber system 300. The "EXECUTE LOCSOFT" routine starts at step S560 and proceeds to step S561, where the server 200 inputs the version of the client application software being run on the subscriber system 300.

Next, at step S562, the control system determines if all necessary parameters were input at step S561 and if any of the parameters input at step S561 are invalid. If all of the parameters are present and valid, control continues to step S563. Otherwise, control jumps to step S564.

At step S563, the server 200 sends the version number and the URL address of the latest client components software to the subscriber system 300. Then control jumps to step S565. At step S564, the server 200 sends an error message to the subscriber system 300. Control then continues to step S565. At step S565, the control routine returns to step S570.

Figure 8:
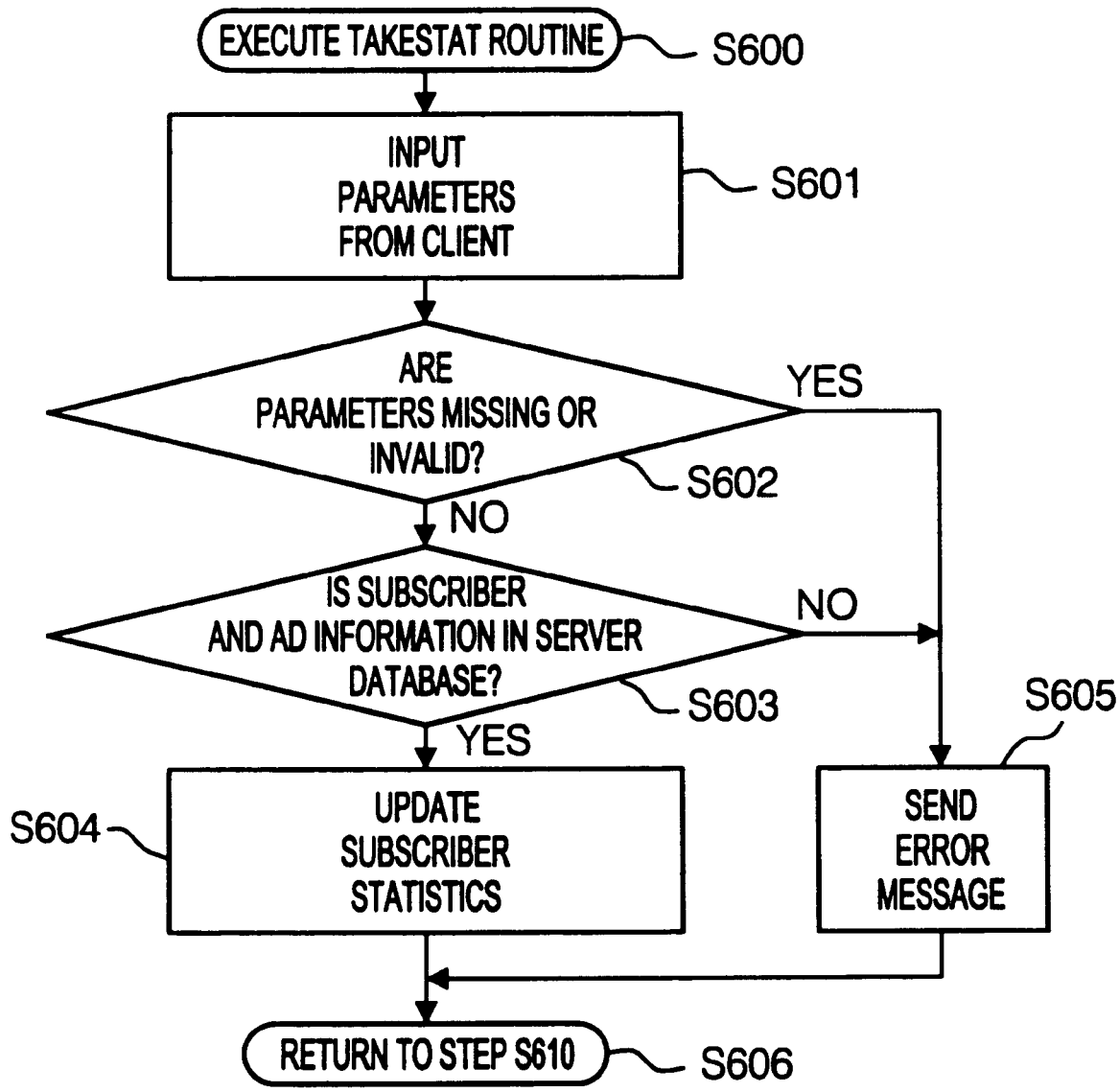
FIG. 8 is a flow chart of a preferred control routine, executed by the server, for updating subscriber statistics received from the subscriber system.

FIG. 8 shows a preferred version of the TAKESTAT routine executed by the server 200 at step S600 of FIG. 6B, which is used to update the Subscriber Statistics. The "EXECUTE TAKESTAT" routine starts at step S600 and proceeds to step S601, where the server 200 inputs the Subscriber Statistics from the subscriber system 300.

Next, at step S602, the server 200 determines if all the necessary parameters were input at step S601 and if any of the parameters input at step S603 are invalid. If all of the parameters are present and valid control continues to step S603. Otherwise, control jumps to step S605. At step S603, the control system determines if the subscriber associated with the subscriber system 300 and the advertisement information for the advertisements played on the subscriber system 300 are in the database 220 of the server 200. If so, control continues to step S604. Otherwise, control jumps to step S605. At step S604, the server 200 updates the Subscriber Statistics in the database 220. Then, control jumps to step S606.

At step S605, the server 200 sends an error message to the subscriber system 300. Control then continues to step S606. At step S606, the control routine returns to step S610.

The server 200 obtains all of the Subscriber Statistics from the subscriber system 300 for all of the advertisements played on the subscriber system 300, and preferably does so for a number of different subscriber systems 300. Then, the various advertisers that have used the server 200 to distribute their advertisements to the various subscriber systems 300 are contacted. Each advertiser is supplied with information based on the updated Subscriber Statistics stored in the database 220 for advertisements of that advertiser. The information can include the number of times each advertisement was viewed by users of the various subscriber systems and information derived from the profiles of those users.

In addition, each advertiser is billed based on the information transmitted to that advertiser. That is, the advertiser is billed based on the supplied information, which is gathered after that advertisers advertisements were viewed by the users. Thus, the advertiser can be assured that the advertisements were actually viewed by the users, and that the bill is justified.

Figure 9:
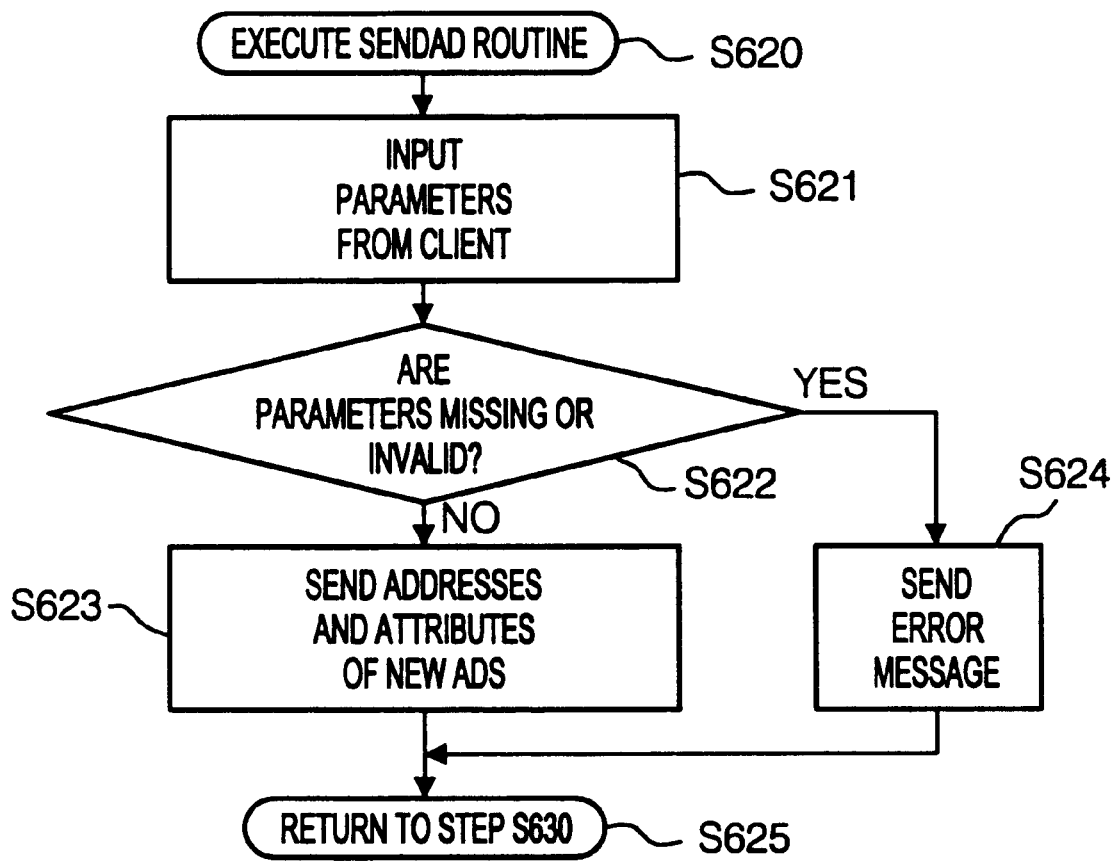
FIG. 9 is a flow chart of a preferred control routine, executed by the server, for identifying advertisements that are available for downloading by the subscriber system.

FIG. 9 shows a preferred version of the SENDAD routine executed by the server 200 at step S620 of FIG. 6B, which is used to identify new advertisements to be downloaded by the subscriber system 300. The "EXECUTE SENDAD ROUTINE" starts at step S600 and proceeds to step S621, where the server 200 inputs information on the advertisement capacity of the advertisement queue on the subscriber system 300.

Next, at step S622, the server 200 determines if any necessary parameters were not input at step S621, or if any of the input parameters are invalid. If all of the parameters are present and valid, control continues to step S623. Otherwise, control jumps to step S624. At step S623, the server 200 sends the URL addresses and the attributes of new advertisements that are available for downloading to the subscriber system 300. Control then jumps to step S625.

At step S624, the server 200 sends an error message to the subscriber system 300. Control then continues to step S625. At step S625, the control routine returns to step S630.

FIG. 10 shows a preferred version of the TAKEACK routine executed by the server at step S650 of FIG. 6B, which is used to acknowledge that new advertisements have been downloaded by the subscriber system 300.

The "EXECUTE TAKEACK ROUTINE" starts at step S650 and proceeds to step S651, where the server 200 inputs information on the identity of advertisements that have been downloaded by the subscriber system 300.

Next, at step S652, the server determines if all necessary parameters have been input at step S651, or if any of the input parameters are invalid. If all of the parameters are present and valid, control continues to step S653. Otherwise, control jumps to step S654. At step S653, the server 200 acknowledges the advertisements that have been downloaded by the subscriber system 300 by sending an acknowledgment message for each advertisement that was downloaded by the subscriber system 300. Control then jumps to step S655. At step S655, the control routine returns to step S660.

At step S654, the server 200 sends an error message to the subscriber system 300. Control then continues to step S655.

As described above, the processors 310 and 210 are preferably implemented on a programmed general purpose computer. However, they can also be implemented on a special purpose computer, a programmed microprocessor or microcontroller and peripheral integrated circuit elements, an ASIC or other integrated circuit, a hardwired electronic or logic circuit such as a discreet element circuit, a programmable logic device such as a FPGA, PLD, PLA or PAL, or the like such as a network computer or a television set running WEBTV®. In general, any device in which a finite state machine capable of implementing the flow charts shown in FIGS. 5–10 can be used to implement the processors 310 and/or 210 of this invention.

Also, the memories 320 and 220 are preferably implemented using static or dynamic RAM. However, the memories 320 and 220 can also be implemented using a floppy disk and disk drive, a writeable optical disk and disk drive, a hard drive, flash memory or the like. When this system is implemented using WEBTV® or a network computer, or even a general purpose computer, the memory can be implemented using memory of the Internet service provider.

Although this invention has been described in conjunction with the specific embodiments outlined above, it is evident that many alternatives, modifications and variations will be apparent to those skilled in the art.

For example, the server 200 and the subscriber system 300 have been described above as implemented over the Internet, so that connections between the server 200 and the subscriber system 300 occur via an Internet access application that is either built into the client application or is a stand-alone application that is accessed by the client application. However, the server 200 and the subscriber system 300 may also be implemented over any distributed information network, e.g., a local area network.

In short, any type of distributed information network may be used to exchange information between the server 200 and the subscriber system 300, as long as the server 200 supplies the subscriber system 300 with advertisements that are specifically targeted to individual subscribers.

Accordingly, the preferred embodiments of the invention as set forth above are intended to be illustrative, not limiting. Various changes may be made without departing from the spirit and scope of the invention as defined in the following claims.

What is claimed is:

1. An advertisement display apparatus for displaying, to a user of the advertisement display apparatus, selectively distributed advertisements transmitted over a distributed network, the advertisement display apparatus comprising:

a memory that stores at least one of the selectively distributed advertisements;

a processor that visibly displays one of the at least one stored selectively distributed advertisement on a display, the display driven by the processor;

a low level determination circuit that determines if a number of selectively distributed advertisements to be displayed remaining in the memory has reached a predetermined low level; and a communication device connectable to an advertisement distribution system over the distributed network if the low level determination circuit has determined that the number of selectively distributed advertisements to be displayed remaining in the memory has reached the predetermined low level, wherein the selectively distributed advertisements are identified by the advertisement distribution system based on a profile of the user supplied to the advertisement distribution system.

2. The advertisement display apparatus of claim 1, wherein if the processor also visibly displays at least one additional window and the advertisement window overlaps any of the at least one additional window, the advertisement window is displayed over each such additional window.

3. The advertisement display apparatus of claim 1, wherein the advertisement window further comprises a status window.

4. The advertisement display apparatus of claim 3, wherein the status window comprises at least one of:

a total credit amount indicator;

a virtual credit amount indicator;

a connection time-out indicator;

a profile update control portion; and a quit control portion.

5. The advertisement display apparatus of claim 4, wherein the total credit amount indicator indicates a number of credits assigned to the user based on a number of advertisements displayed in the advertisement window.

6. The advertisement display apparatus of claim 4, wherein the virtual credit amount indicator indicates a number of times a currently displayed advertisement has been displayed in the advertisement window.

7. The advertisement display apparatus of claim 4, wherein the connection time-out indicator indicates a remaining time period for connection to the advertisement distribution system, wherein, if the advertisement display apparatus is not connected to the advertisement distribution system within the remaining time period, connection to the advertisement distribution system, after the remaining time period has elapsed, is denied by the advertisement distribution system.

8. The advertisement display apparatus of claim 4, further comprising a selection device, wherein selection of the profile update control portion causes the communication device to connect to the advertisement distribution system over the distributed network, the processor communicating with the advertisement distribution system to update the profile of the user supplied to the advertisement distribution system.

9. The advertisement display apparatus of claim 3, further comprising a status window control portion and a selection device, wherein selection of the status window control portion by the selection device alternately toggles the display of the status window.

10. The advertisement display apparatus of claim 1, wherein the selectively distributed advertisements are displayed in an advertisement display portion and wherein a size of the advertisement display portion is based on a size of the selectively distributed advertisement displayed in the advertisement display portion.

11. The advertisement display apparatus of claim 1, wherein the selectively distributed advertisements are displayed in an advertisement display portion and further comprising a selection device, wherein, if a selectively distributed advertisement displayed in the advertisement display portion includes a selectable link to a corresponding location on the distributed network, selection of the selectable link causes the communication device to connect to the corresponding location.

12. The advertisement display apparatus of claim 1, further comprising a selection device, wherein, when a selectively distributed advertisement displayed in the advertisement window includes a selectable link to a corresponding location on the distributed network, selection of the selectable link causes the communications device to connect to the corresponding location.

13. The advertisement display apparatus of claim 1, further comprising a sound generating system, wherein, when a selectively distributed advertisement displayed in the advertisement window includes a sound generating system, the sound portion outputs the sound portion.

14. The advertisement display apparatus of claim 1, wherein the advertisements are stored in the memory in an advertisement database.

15. The advertisement display apparatus of claim 14, wherein the advertisement database includes, for each advertisement, at least one of:
  an advertisement identifier that uniquely identifies the advertisement;
  advertiser data identifying the advertiser sponsoring the advertisement;
  a time frame defining a time during which the advertisement should be displayed;
  a size of a display of the advertisement;
  an expiration date of the advertisement;
  day data indicating a current day;
  a first number defining a maximum total number of times the advertisement should be displayed;
  a second number defining a maximum number of times the advertisement should be displayed each day;
  a third number indicating a total number of times the advertisement has previously been displayed to the user;
  a fourth number indicating a number of times the advertisement has been displayed on the current day.

16. The advertisement distribution system of claim 15, wherein the time frame defining the time during which the advertisement should be displayed includes at least one of:
  an hour frame indicating the hours of the day during which the advertisement should be displayed;
  a day frame indicating the days of the week, month or year during which the advertisement should be displayed;
  a week frame indicating the weeks of the month or year during which the advertisement should be displayed; and
  a month frame indicating the months of the year during which the advertisement should be displayed.

17. The advertisement distribution system of claim 15, wherein the size of the advertisement includes at least one of:
  a height of the advertisement; and
  a width of the advertisement.

18. The advertisement display apparatus of claim 1, wherein at least one of the advertisements stored in the memory includes a sound portion.

19. The advertisement display apparatus of claim 1, wherein at least one of the advertisements stored in the memory includes a displayable and selectable link to a corresponding location on the distributed network.

20. The advertisement display apparatus of claim 1, wherein the connection device comprises at least a browser.

21. The advertisement display apparatus of claim 1, further comprising:
  at least one input device connected to the processor; and
  an activity monitor that monitors activity of at least one input device connected to the processor, wherein display of the advertisement window is based on activity of the at least one input device.

22. An advertisement display apparatus for displaying, to a user of the advertisement display apparatus, selectively distributed advertisements transmitted over a distributed network, the advertisement display apparatus comprising:
  a memory that stores at least one of the selectively distributed advertisements;
  a processor that visibly displays one of the at least one stored selectively distributed advertisement on a display, the display driven by the processor; and
  a communication device connectable to an advertisement distribution system over the distributed network, wherein the selectively distributed advertisements are identified by the advertisement distribution system based on a profile of the user supplied to the advertisement distribution system; wherein the advertisement window comprises a state indicator.

23. The advertisement display apparatus of claim 22, wherein the state indicator indicates if there is a need to connect to the advertisement distribution system over the distributed network.

24. The advertisement display apparatus of claim 23, wherein an appearance of the state indicator indicates an urgency of the need to connect to the advertisement distribution system.

25. An advertisement distribution and display system comprising:
  an advertisement distribution system that selectively distributes advertisements to a plurality of recipients over a distributed network that connects the advertisement distribution system to the plurality of recipients, comprising:
    a first memory that stores a plurality of advertisements,
    a second memory that stores a plurality of recipient profiles, each recipient profile corresponding to one of the plurality of recipients and defining an advertisement profile of that recipient, and
    a first processor that, in response to low advertisement level information received from one of the plurality of recipients, selects at least one of the plurality of advertisements based on the recipient profile for that recipient and transmits at least information corresponding to the at least one selected advertisement to the recipient over the distributed network; and
  an advertisement display apparatus that displays, to a user of the advertisement display apparatus, the selectively distributed advertisements identified by the advertisement distribution system transmitted over the distributed network, comprising:
    a memory that stores at least one of the selectively distributed advertisements,
    a second processor that visibly displays one of the at least one stored selectively distributed advertisement on a display, the display driven by the second processor,
    a low level determination circuit that determines if a number of selectively distributed advertisements to be displayed remaining in the memory has reached a predetermined low level; and
    a communication device connectable to the advertisement distribution system over the distributed network if the low level determination circuit has determined that the number of selectively distributed advertisements to be displayed remaining in the memory has reached the predetermined low level, wherein the selectively distributed advertisements are identified by the advertisement distribution system based on the profile of the user supplied to the advertisement distribution system.

26. An advertisement display apparatus for displaying, to a user of the advertisement display apparatus, selectively distributed advertisements transmitted over a distributed network, the advertisement display apparatus comprising:

a memory that stores at least one of the selectively distributed advertisements;

a processor that visibly displays one of the at least one stored selectively distributed advertisement on a display, the display driven by the processor; and a communication device connectable to an advertisement distribution system over the distributed network, wherein the selectively distributed advertisements are identified by the advertisement distribution system based on a profile of the user supplied to the advertisement distribution system, wherein the advertisement window comprises a connection control portion.

27. The advertisement display apparatus of claim 26, further comprising a selection device, wherein selection of the connection control portion causes the communication device to connect to the advertisement distribution system over the distributed network.

* * * * *